United States Patent Office 3,554,868
Patented Jan. 12, 1971

3,554,868
REACTOR INTERNALS LOWER RADIAL
SUPPORT SYSTEM
Arthur G. Thorp II, deceased, late of Churchill Borough, Pa., by Ruth S. Thorp, administratrix, Churchill Borough, Pa., assignor to Westinghouse Electric Corporation, Pittsburgh, Pa., a corporation of Pennsylvania
Filed Oct. 9, 1967, Ser. No. 674,705
Int. Cl. G21c 1/02
U.S. Cl. 176—40
10 Claims

ABSTRACT OF THE DISCLOSURE

A lower radial support system is provided for a nuclear reactor internals which permits free radial and axial differential expansion while preventing the lower end of the internals from moving off center due to vibration or earthquake shock. One embodiment includes a plurality of Inconel plates welded to the bottom of the reactor pressure vessel and an Inconel centering sleeve, the upper end of which is fitted to the bottom support plate for the reactor core in such a way as to have an interference fit on the inside diameter of the sleeve at operating temperature. The lower end of the sleeve is fitted to the plate structure with a tapered fit to permit vertical differential expansion of the reactor internals.

BACKGROUND OF THE INVENTION

This invention relates generally to nuclear reactors and, more particularly, to a radial support system for the lower end of the internals of a reactor.

A prior radial support system for the lower end of reactor internals consists of a series of keys secured to the internals and keyways secured to the reactor vessel. The prior system permits free radial and axial differential expansion while preventing the lower end of the internals from moving off center due to vibration or earthquake shock. However, the keys and keyways require careful fitting when the reactor is installed in the field, thereby increasing the cost of installation.

An object of this invention is to provide a radial support system for reactor internals which is less costly than prior support systems and which will reduce the field fitting requirements.

Another object of the invention is to provide a lower radial support system which will permit relatively free coolant flow to the center of the lower support plate for the reactor core.

Other objects of the invention will be explained fully hereinafter or will be apparent to those skilled in the art.

SUMMARY OF THE INVENTION

In accordance with one embodiment of the invention, vertically extending plates disposed at right angles to each other are welded to the bottom of a reactor vessel. The plates are composed of Inconel, or other corrosion resistant metal, having about the same coefficient of expansion as the metal of the vessel. A generally cylindrical centering sleeve is fabricated from Inconel so that it matches the thermal expansion of the plate structure, but does not match the thermal expansion of the bottom support plate for the reactor core which is composed of a metal, such as stainless steel, having a higher coefficient of expansion than Inconel. The top of the centering sleeve is fitted to the bottom support plate in such a way as to have an interference fit on the inside diameter of the sleeve at operating temperature. The bottom of the sleeve has a tapered fit with the plate structure and the sleeve is proportioned to have zero induced radial deformation at the lower edge, thereby permitting free radial and axial differential expansion of the reactor internals while preventing the lower end of the internals from moving off center.

BRIEF DESCRIPTION OF THE DRAWING

For a better understanding of the nature and objects of the invention, reference may be had to the following detailed description, taken in conjunction with the accompanying drawings, in which.

DESCRIPTION OF THE PREFERRED EMBODIMENT

Figure 1:
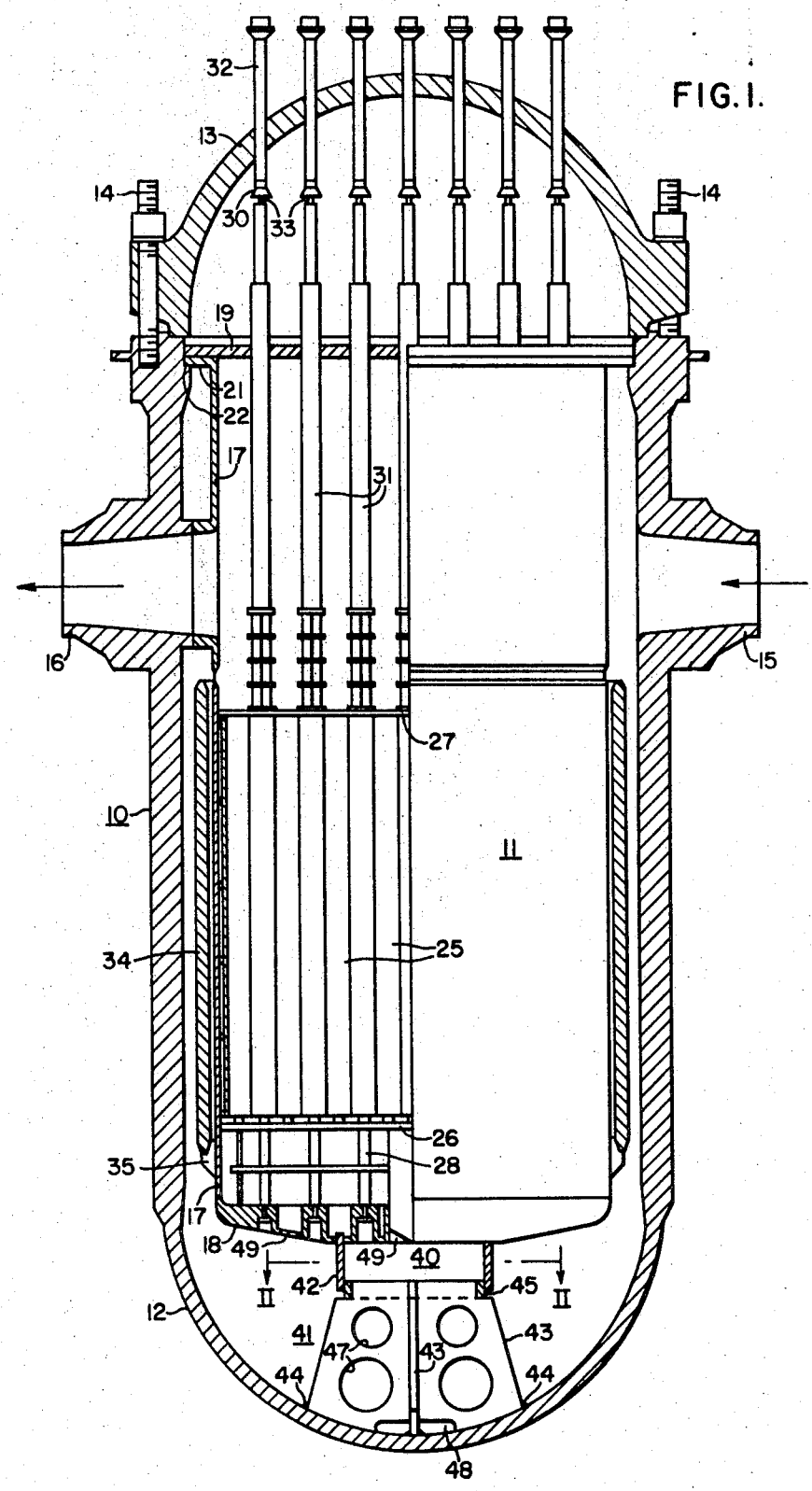
FIG. 1 is a view, partly in longitudinal section and partly in elevation, of a nuclear reactor embodying principal features of the invention.

Referring to the drawing, particularly to FIG. 1, the reactor shown therein comprises a generally cylindrical vessel 10 containing reactor internals 11. The vessel 10 has a generally hemispherical bottom 12 and a removable generally hemispherical head 13. The head 13 is retained in position by a plurality of head bolts 14. The vessel 10 has an inlet nozzle 15 and an outlet nozzle 16 to permit a coolant fluid to be circulated through the reactor. Additional inlet and outlet nozzles are usually provided.

The reactor internals 11 are contained within a core barrel 17 having a bottom support plate 18 and a top support plate 19. The barrel 17 is suspended within the vessel 10 by means of a circumferential flange 21 at the top of the barrel which rests upon a ledge 22 on the inner periphery of the vessel 10. The plate 19 is retained on top of the flange 21 by the head 13, a portion of which overlaps the cover 19.

The reactor internals 11 include a plurality of fuel assemblies 25 vertically mounted between a bottom core plate 26 and a top core plate 27. The bottom core plate 26 is supported by a plurality of bottom support columns 28 extending between the plate 26 and the bottom support plate 18. Control rod guide tubes 31 extend from the top core plate 27 through the support plate 19 into the volume within the head 13. Control rod drive housings 32 extend through the head 13 and contain drive rods 33 which are connected to the control rods within the tubes 31. A thermal sleeve 30 is provided on each drive rod 33. The control rods are raised and lowered by means of an operating mechanism (not shown) which actuates the drive shafts 33. A cylindrical thermal shield 34 surrounds the portion of the core barrel 17 containing the fuel assemblies 25. The shield 34 is supported by lugs 35 attached to the core barrel 17.

In order to permit radial and axial differential expansion of the reactor internals while preventing the lower end of the internals from moving off center, a lower radial support system 40 is provided. The support system 40 comprises a radial support structure 41 and a centering sleeve 42.

Figure 2:
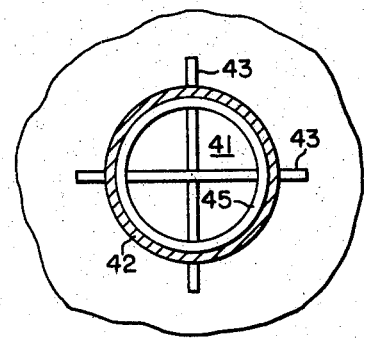
FIG. 2 is a sectional view, taken along the line II—II in FIG. 1.
Figure 3:
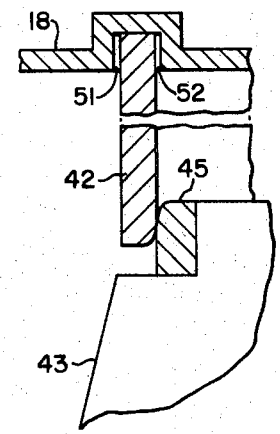
FIG. 3 is an enlarged detail view of a portion of the centering device for the reactor internals shown in FIG. 1.

As shown in FIGS. 1, 2 and 3, the support structure 41 includes a plurality of vertically extending plates 43 which are disposed at right angles to each other and secured to the bottom 12 of the vessel 10, as by welding at 44. The plates 43 are notched at the top to receive a ring 45 which encircles the top portions of the plates. Different arrangements of plates may be utilized. As shown in FIG. 2, one plate may extend across the diameter of the ring 45 and two plates may be disposed with their inner ends abutting the one plate and secured thereto, as by welding.

The ring 45 is secured to the plates 43 by a press fit or by welding.

Figure 4:
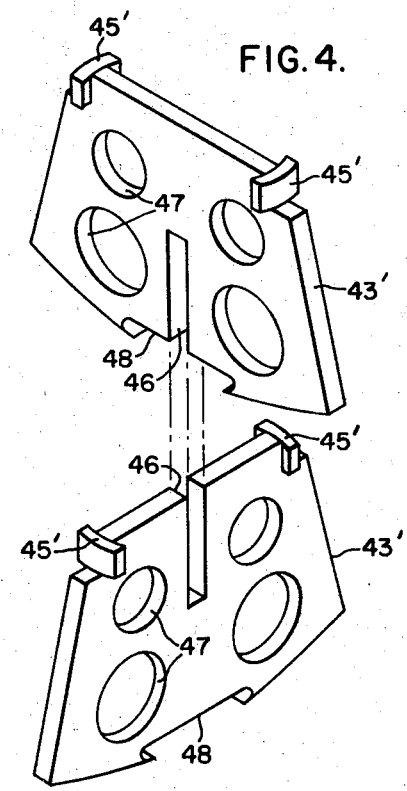
FIG. 4 is an exploded view of a modified form of plate structure for the centering device.

As shown in FIG. 4, two plates 43' may be utilized with each plate being notched at 46 to permit them to be assembled at right angles to each other. Also, segments 45' of a ring may be secured to each plate 43' in place of the continuous ring 45. The plates have openings 47 therein and a notch 48 at the bottom of each plate to provide for circulation of the coolant to the center of the lower support plate 18 which contains openings 49 therethrough to permit the coolant to flow upwardly into the core barrel 17.

The plates 43 are composed of a corrosion resistant metal, such as Inconel, having substantially the same coefficient of expansion as the metal of the vessel 10. The plate structure is constructed to provide the desired stiffness, for example for one particular application the desired spring rate should exceed $5 \times 10^6$ pounds per inch deflection at the top. Other spring rates may be provided as required for each application.

The centering sleeve 42 is also fabricated from the same metal as the radial support structure 41. Therefore it matches the thermal expansion of the support structure, but does not match the thermal expansion of the bottom support plate 18 which is preferably made from stainless steel or other metal having a higher coefficient of expansion than the metal of the centering sleeve. As shown more clearly in FIG. 3, the upper end of the centering sleeve 42 is disposed in a groove 51 in the bottom support plate 18. The sleeve 42 is fitted to the bottom support plate in such a way as to have an interference fit on the inside diameter of the ring at operating temperature of the reactor. This results in outward radial deformation of the sleeve which could cause a change in the tapered fit with the ring 45 of the support structure 41. In order to avoid this situation and to provide assurance of free axial motion between the sleeve and the plate structure, for vertical differential expansion of the internals, the centering sleeve 42 is proportioned to have zero induced radial deformation at its lower edge. This is accomplished by satisfying the following relationship for the dimensions of the sleeve:

$$\frac{L \times \sqrt[4]{3(1-\mu)^2}}{\sqrt{RT}} = \frac{5}{4} \pi$$

where:

L = axial length of sleeve
R = mean radius of sleeve
T = thickness of sleeve wall
$\mu$ = Poisson's ratio for sleeve material.

By following the above rule for proportions, the initial cold assembly tapered fit between the lower end of the sleeve 42 and the ring 45, or the segments 45', is maintained at all system pressures and temperatures and may be made as close as is required for adequate bracing of the internals to enable them to withstand vibration or earthquake shock.

The centering device including the sleeve 42 is assembled inside the reactor vessel prior to the installation of the reactor internals which are lowered into the vessel with the upper end of the sleeve 42 being disposed in the groove 51 in the bottom support plate 18. As previously explained, when the reactor reaches operating temperature the inside diameter of the sleeve 42 is engaged by the bottom support plate 18 at 52 with an interference fit.

Figure 5:
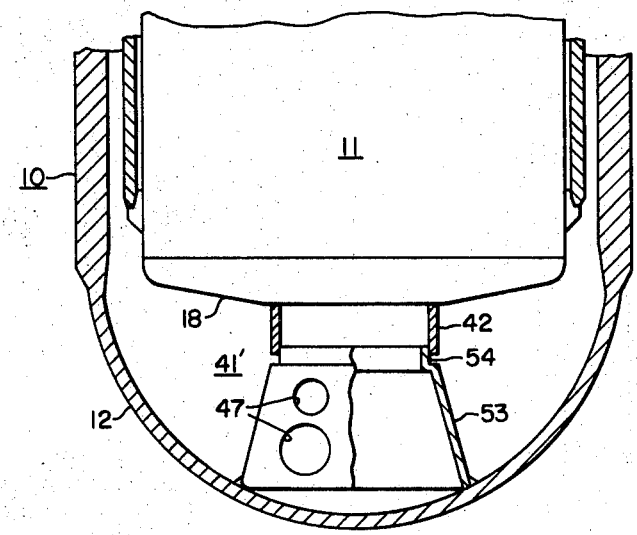
FIG. 5 is a view, partly in section and partly in elevation, of an alternate support for the centering device.

Alternate radial support structures may be utilized to replace the plate structure 41. Thus, a cylinder may be utilized in place of the plates 43 or, as shown in FIG. 5, a conical frustum 53 having a cylindrical portion 54 at its upper end may be utilized. The cylindrical portion 54 engages the centering sleeve 42 with a tapered fit in a manner similar to the fit between the sleeve 42 and the ring 45 previously described. The conical shell 53 has openings 47 therein to permit circulation of a coolant fluid. The bottom of the conical shell is welded to the bottom 12 of the vessel 10.

From the foregoing description it is apparent that the invention provides a lower radial support system for reactor internals which may be economically manufactured and installed without excessive field fitting requirements. The system permits free radial and axial differential expansion, while preventing the lower end of the internals from moving off center due to vibration or earthquake shock.

What is claimed is:

1. In a nuclear reactor, in combination, a reactor vessel, a core barrel means suspended in the vessel and having a bottom support plate, reactor internals supported by said barrel means, a radial support structure secured to the bottom of the vessel, and a centering sleeve interposed between the bottom support plate and the radial support structure and slidably engaging the radial support structure to permit radial and axial differential expansion of the reactor internals while preventing the lower end of the internals from moving off center.

2. The combination defined in claim 1 wherein the upper end of the centering sleeve is fitted to the bottom support plate with an interference fit at operating temperature of the reactor and the lower end of the sleeve has a tapered fit with the radial support structure.

3. The combination defined in claim 1 wherein the radial support structure and the centering sleeve are composed of a metal having substantially the same coefficient of expansion as the metal of the vessel and a lower coefficient of expansion than the metal of the bottom support plate.

4. The combination defined in claim 2 wherein the centering sleeve is proportioned to have zero induced radial deformation at its lower edge.

5. The combination defined in claim 2 wherein the dimension of the centering sleeve satisfy the relationship expressed by the formula:

$$\frac{L \times \sqrt[4]{3(1-\mu)^2}}{\sqrt{RT}} = \frac{5}{4} \pi$$

where: L = axial length of sleeve; R = mean radius of sleeve; T = thickness of sleeve wall; $\mu$ = Poisson's ratio for sleeve material.

6. The combination defined in claim 1 wherein the radial support structure comprises a plurality of vertically extending plates secured together at right angles to each other.

7. The combination defined in claim 6 wherein a ring is secured at the upper ends of the plates.

8. The combination defined in claim 6 wherein each plate has a segment of a ring secured at its upper end.

9. The combination defined in claim 1 wherein the radial support structure comprises a conical frustum.

10. The combination defined in claim 1 wherein the vessel has a ledge around its inner periphery, and the core barrel means has a circumferential flange at its top resting on the ledge to support the barrel and space it from the vessel wall.

References Cited

UNITED STATES PATENTS 3,275,521  9/1966  Schluderberg et al. __ 176—87X

FOREIGN PATENTS 844,401  8/1960  Great Britain _____ 176—87
1,234,324  10/1960  France _____ 176—87
1,266,010  9/1961  Great Britain _____ 176—87

REUBEN EPSTEIN, Primary Examiner

U.S. Cl. X.R.

176—87; 248—20